(12) United States Patent
White, III

(10) Patent No.: US 6,561,454 B1
(45) Date of Patent: May 13, 2003

(54) NETWORK HUB FOR A RECONFIGURABLE DATA NETWORK HAVING PHYSICAL TRANSMISSION MEDIA

(75) Inventor: Orland Kermit White, III, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/141,024

(22) Filed: May 8, 2002

(51) Int. Cl.[7] .................................................. G05D 1/00
(52) U.S. Cl. ..................... 244/1 R; 244/194; 385/134
(58) Field of Search ............................. 359/24, 35, 46, 359/47, 48, 167; 244/1 R, 194, 221, 96, 117 R, 904; 385/134

(56) References Cited

U.S. PATENT DOCUMENTS

| | | | | |
|---|---|---|---|---|
| 4,422,180 A | * | 12/1983 | Wendt | 359/148 |
| 5,896,473 A | * | 4/1999 | Kaspari | 385/24 |
| 5,971,623 A | * | 10/1999 | Wanamaker | 385/53 |
| 6,356,809 B1 | * | 3/2002 | Morrison et al. | 700/286 |
| 2002/0065582 A1 | * | 5/2002 | Morrison et al. | 293/58 |

OTHER PUBLICATIONS

"Network Devices Inc.", http://ecc400.com/networkdevices/products.htm, pp. 1–4.*
"The many faces of PDF", Webopedia.com, pp. 1–3.*
"Fiber optic network Topologies for ITS and Other systems", Fiber Optics System Design, www.fiber–optics.info/articles/its–networks.htm, pp. 1–3.*

* cited by examiner

*Primary Examiner*—Charles T. Jordan
*Assistant Examiner*—Stephen A Holzen
(74) *Attorney, Agent, or Firm*—Bracewell & Patterson, L.L.P.

(57) ABSTRACT

A data network includes a plurality of network devices, a plurality of physical transmission lines each coupled to a respective one of said plurality of network devices, and a network hub coupled to each of said plurality of physical transmission lines. The network hub has a removable and replaceable termination element providing signal connectivity between selected ones of said plurality of transmission lines. In one embodiment, the data network is installed within an aircraft including a fuselage, an empennage connected to the fuselage, a lift-generating surface coupled to the fuselage, and at least one engine for propelling the aircraft.

10 Claims, 3 Drawing Sheets

NETWORK HUB FOR A RECONFIGURABLE DATA NETWORK HAVING PHYSICAL TRANSMISSION MEDIA

BACKGROUND OF THE INVENTION

1. Technical Field

The present invention relates generally to communication networks and, in particular, to data networks having physical transmission media. Still more particularly, the present invention is directed to a removable and replaceable network hub that facilitates centralized testing and reconfiguration of a data network having physical transmission media.

2. Description of the Related Art

A data network requires ongoing maintenance to upgrade or replace aging or failed network devices and to insert additional network devices into the data communication network. Such maintenance is performed relatively easily when the network device(s) to be replaced, upgraded or inserted are installed within a special purpose facility, such as a computer room having raised-access flooring or a network closet. In such cases, the ease of maintenance is due to the ability to easily access both the network devices and the physical transmission media (e.g., cabling) utilized to connect the network devices to the data communication network.

In some network installations, however, network maintenance is problematical in that the devices and/or the network transmission media comprising the data network are not easily accessible. For example, the insertion or removal of a network device or other topological changes to a data network installed within an aircraft often requires gutting the cockpit and/or cabin of the aircraft in order to access the installation sites of one or more network devices and portions of the aircraft wiring affected by the network change.

FIG. 1 is a high level plan view of an aircraft having a conventional data network. As illustrated, aircraft 10, which comprises a fuselage 12, wings 14, engines 16 and tail section (empennage) 18, has a data network 20 installed therein. In the depicted embodiment, data network 20 is a fibre channel arbitrated loop including a number of network devices 22, which are coupled together by fiber optic cables 24 terminated on either end by connectors 26. Network devices 22 may include, for example, an avionics computer, avionics sensors, aircraft system controls, and communications equipment.

As will be appreciated, data network 20 is typically installed within fuselage 12 behind cockpit instrumentation panels and other fixtures within the cabin interior. Consequently, if data network 20 requires testing, maintenance, or modification, for example, by the addition or removal of a network device 22 or reordering of network devices 22 within the loop, many of the fixtures of the cabin interior may have to be removed to access network devices 22 and/or fiber optic cables 24. It is therefore time consuming, expensive and inconvenient to reconfigure or test data network 20 and its components.

SUMMARY OF THE INVENTION

In recognition of the foregoing and additional difficulties with testing and reconfiguring conventional data network installations, the present invention provides an improved data network and a network hub for structures such as aircraft in which access to network infrastructure is restricted.

In accordance with the present invention, the data network includes a plurality of network devices, a plurality of physical transmission lines each coupled to a respective one of said plurality of network devices, and a network hub coupled to each of said plurality of physical transmission lines. The network hub has a removable and replaceable termination element providing signal connectivity between selected ones of said plurality of transmission lines. In one embodiment, the data network is installed within an aircraft including a fuselage, an empennage connected to the fuselage, a lift-generating surface coupled to the fuselage, and at is least one engine for propelling the aircraft.

Additional objects, features, and advantages of the present invention will become apparent from the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 2:
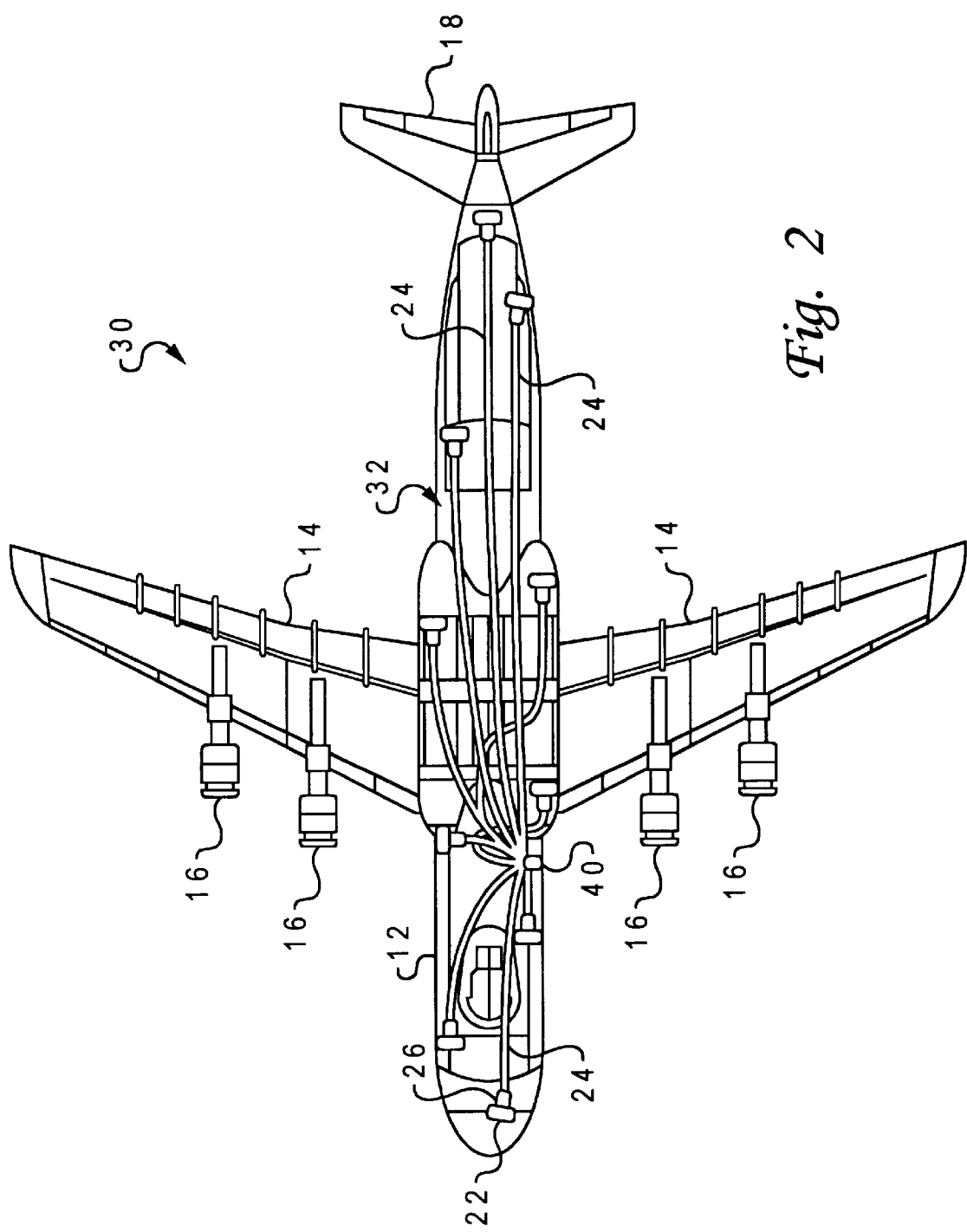
FIG. 2 is a high level plan view of an aircraft having a data network installed therein in accordance with the present invention.

With reference again to the figures and in particular to FIG. 2, there is depicted a high level plan view of an aircraft that, in accordance with the present invention, has a data network installed therein that facilitates network testing, maintenance and reconfiguration. As shown, aircraft 30, which in the, illustrated embodiment is a commercial or military transport aircraft, includes a number of conventional components, including a fuselage 12, a tail section (empennage) 18, a pair of wings 14 providing lift, and a number of engines 16 to propel aircraft 30. As will become apparent, the present invention is not limited to the illustrated aircraft embodiment, but is instead applicable to any type of aircraft, including combat aircraft, surveillance aircraft, helicopters, etc., which incorporates a data network.

As shown, aircraft 30 has a data network 32 installed therein. In the depicted embodiment, data network 32 is a fibre channel arbitrated loop including a number of network devices 22 distributed throughout fuselage 12 (and in other embodiments, within wings 14 and/or empennage 18). At a physical level, network devices 22 are coupled together in a star configuration in which each network device 22, which may comprise an avionics computer, avionics sensor, aircraft system control, communications equipment or other network-compatible device, is connected to a first end of a respective fiber optic cable 24 by a connector 26, and each fiber optic cable 24 has a second end connected to fiber optic hub 40. As described further below with respect to FIG. 3, fiber optic hub 40 provides signal connectivity between selected fiber optic cables 24 so that data network 32 logically functions as an arbitrated loop network, despite its star-configuration physical topology.

Although in most cases it is preferable to couple all network devices 22 to a single fiber optic hub 40 as shown in FIG. 2A, it is contemplated that, in some embodiments, it may be preferable for redundancy or modularity to implement multiple fiber optic hubs 40 coupled together by one or more fiber optic cables. In such embodiments, appropriate implementation of fiber optic hubs 40 will still permit the logical configuration of the data network as a single loop.

Figure 3:
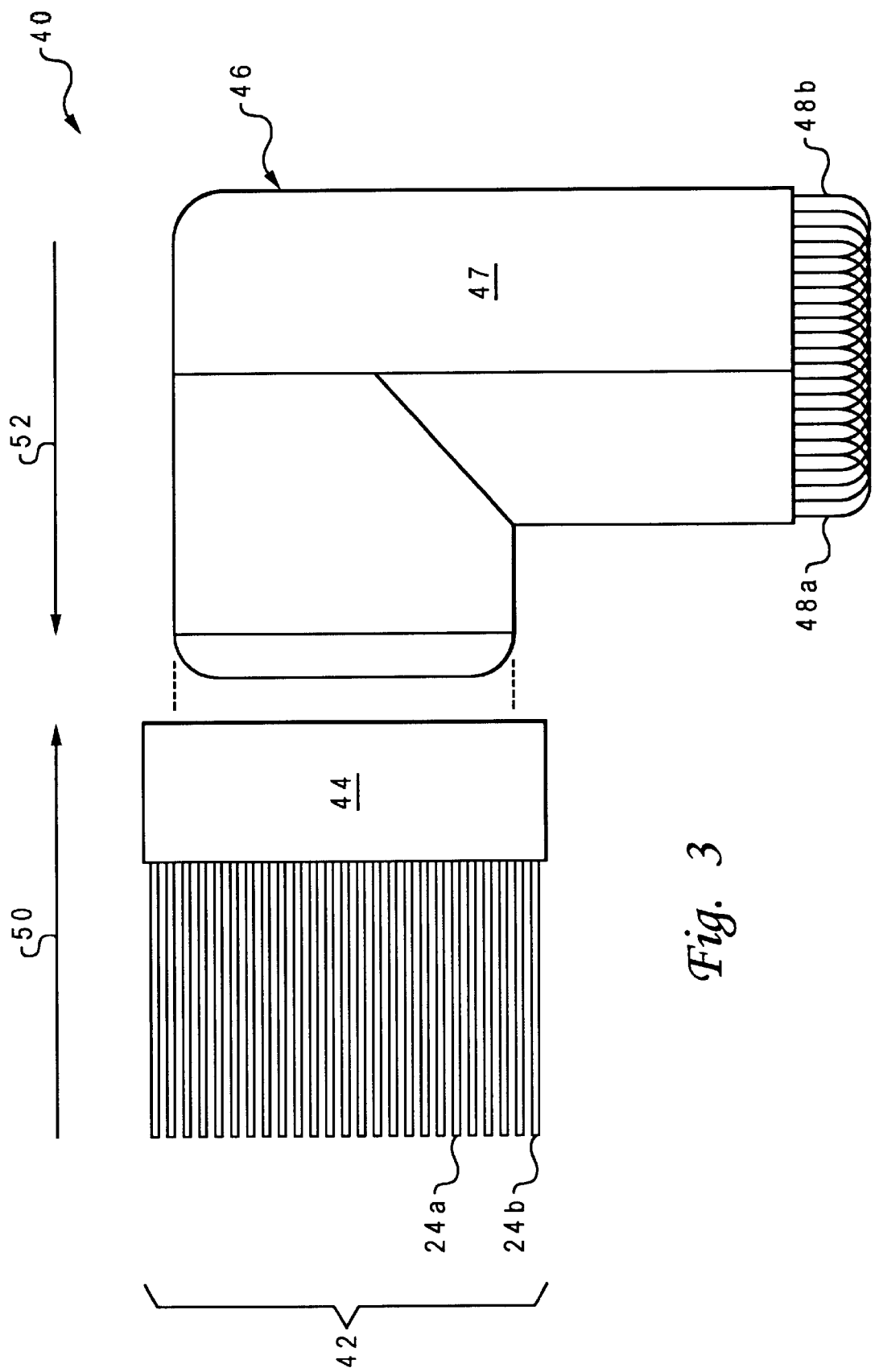
FIG. 3 depicts an exploded view of an exemplary embodiment of a fiber optic network hub in accordance with the present invention.

Referring now to FIG. 3, there is illustrated an exploded elevation view of an exemplary embodiment of a fiber optic network hub 40 in accordance with the present invention. As shown, fiber optic network hub 40, which is preferably installed behind a removable panel accessible from the cabin interior or on the exterior of fuselage 12, comprises a connector 44 and a removable and replaceable cap 46.

Connector 44, which may comprise, for example, a. MIL-C-38999 connector, provides connections for a number of fiber optic cables 24 comprising the aircraft's fiber optic harness 42. Connector 44 may be connected to replaceable cap 46 by applying manual mating force to connector 44 and replaceable cap 46 in the directions indicated by arrows 50 and 52, and maybe disconnected from replaceable cap 46 by applying manual force to connector 44 and replaceable cap 46 in directions opposite to arrows 50 and 52, respectively.

Replaceable cap 46 includes a housing 47 containing jumpers 48 that each provide optical signal connectivity between one or more fiber optic cables 24. For example, in order to couple network devices 22 in a logical loop having a desired ordering of network devices 22, jumper 48a may provide signal connectivity between fiber optic cables 24a and 24b. As should thus be apparent to those skilled in the art, network devices 22 may be reconfigured in a logical loop having any arbitrary ordering of network devices 22 (or even into another network topology) by installing a replaceable cap 46 containing jumpers 48 providing the appropriate signal connections between fiber optic cables 24. Consequently, network reconfiguration can advantageously be accomplished without the need to access network devices 22 or fiber optic cables 24.

Figure 1:
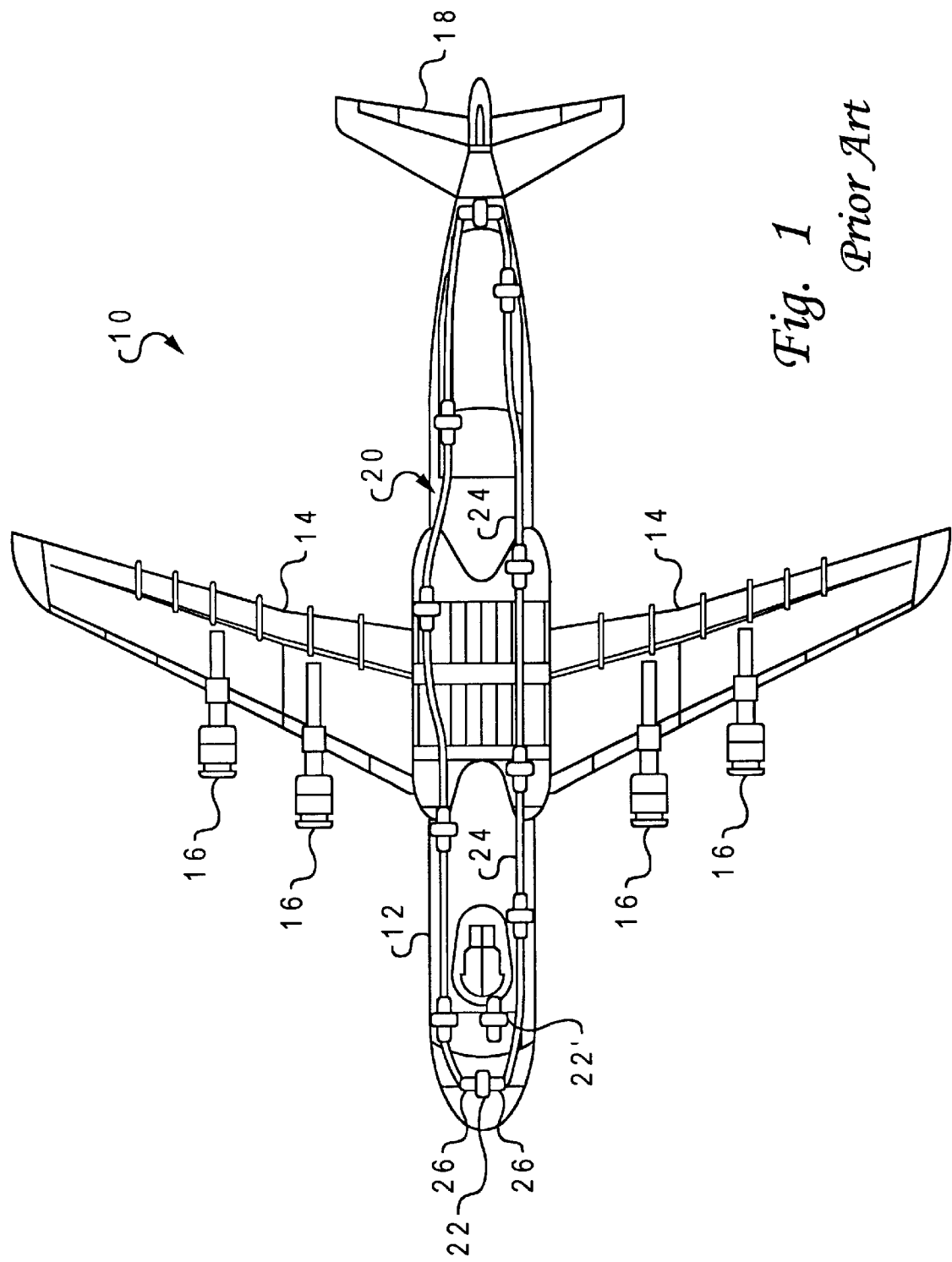
FIG. 1 is a high level plan view of an aircraft having a conventional data network installed therein.

Network equipment modifications and testing are also simplified by the implementation of fiber optic hub 40 within data network 32. For example, if a network device 22 is to be added to or removed from data network 32, only network hub 40, the installation location of the network device 22, and the cabling between the installation location and network hub 40 need to be accessed. Unlike updates to prior art network 20 of FIG. 1, updates to data network 30 do not require access to other network devices 22 and the fiber optic cables 24 to which they are connected. Network testing is similarly simplified by the implementation of fiber optic hub 40 within data network 32 in that there is no need to tear down the cabin interior to access a test site within data network 32. Instead, the removable panel covering fiber optic hub 40 (e.g., in the cabin interior or-on the exterior of fuselage 12) can be removed to permit each fiber optic cable 24 and network device 22 to be individually probed and/or accessed for testing purposes.

For fiber optic networks, the star configuration topology enabled by fiber optic hub 40 also provides performance advantages. In particular, the use of fiber optic hub 40 within data network 32 of FIG. 2 reduces the number of connections, thus reducing fiber optic power loss.

As has been described, the present invention provides a network hub and a data network for an aircraft (or similar structure) that facilitates network reconfiguration and testing without rewiring and/or extensive physical access to the network infrastructure. According to the present invention, the data network includes a plurality of network devices each coupled by a respective one of a plurality of physical transmission lines to a network hub. The network hub includes a connector coupled to the physical transmission lines and a removable termination element (e.g., replaceable cap 46) providing signal connectivity between selected transmission lines.

While the invention has been particularly shown and described with reference to a preferred embodiment, it will be understood by those skilled in the art that various changes in form and detail may be made therein without departing from the spirit and scope of the invention. For example, although the present invention has been described with reference to an illustrative embodiment employing fiber optic cabling, it should be understood that the present invention is also applicable to networks utilizing other physical network transmission media, such as conventional metal wiring.

What is claimed is:

1. An aircraft comprising:
    a body; and
    a data network within said body, said data network including:
        a plurality of network devices spaced apart from one another and distributed at multiple locations within said aircraft;
        a plurality of cables each coupled to a respective one of said plurality of network devices by a respective one of a plurality of first connectors; and
        a network hub within said body and spaced apart from each of said plurality of network devices, said network hub including a second connector coupled to each of sail plurality of cables, said network hub further including a removable and replaceable termination element that mates with said second connector to provide signal connectivity between selected ones of said plurality of cables, wherein said removable and replaceable termination element couples each of said plurality of cables to another of said plurality of cables such that any signal transmitted on said plurality of cables by said plurality of network devices both enters and exits said network hub at said second connector.

2. The aircraft of claim 1, wherein said plurality of cables comprises a plurality of fiber optic cables.

3. The aircraft of claim 1, wherein said plurality of cables includes at least three cables.

4. The aircraft of claim 1, wherein said network hub is disposed adjacent an exterior of the body, and wherein said body includes an openable and closeable exterior access panel covering said network hub to permit access to said network hub from the exterior of said body.

5. The aircraft of claim 1, wherein:
    said body includes:
        an empennage; and
        a lift-generating surface; and
        said aircraft further comprises at least one engine for propelling the aircraft, said at least one engine being coupled to at least one of the body and the lift-generating surface.

6. The aircraft of claim 1, wherein said replaceable termination element comprises a first replaceable termination element and wherein said aircraft further comprises a diverse second replaceable termination element that mates with said second connector to provide signal connectivity between different ones of said plurality of cables wherein said first and said second replaceable termination elements can be alternatively mated with said second connector to obtain diverse first and second network configurations of said data network, respectively.

7. The aircraft of claim 1, wherein:
said plurality of network devices comprises a first plurality of network devices;
said plurality of cables comprises a first plurality of cables;
said network hub comprises a first network hub; and
said data network further comprises:
 a second plurality of network devices;
 a second plurality of cables each coupled to a respective one of said second plurality of network devices;
 a second network hub coupled to said second plurality of cables, said second network hub including a removable and replaceable termination element providing signal connectivity between selected ones of said second plurality of cables; and
 a hub cable coupling said first and second network hubs to provide signal connectivity between at least one of said first plurality of network devices and one of said second plurality of network devices.

8. The aircraft of claim 1, wherein:
said plurality of network devices are physically connected by said plurality of cables to said second connector of said network hub in a star configuration; and
said removable and replaceable termination element of said network hub provides signal connectivity between selected ones of said plurality of cables such that said plurality of network devices communicate signals with one another in a logical loop.

9. The aircraft of claim 1, wherein said removable and replaceable termination element is generally L-shaped.

10. An aircraft, comprising:
a body; and
a data network within said body, said data network including:
 a plurality of network devices spaced apart from one another and distributed at multiple locations within said aircraft;
 a plurality of cables each coupled to a respective one of said plurality of network devices by a respective one of a first plurality of first connectors; and
 a network hub means within said body and spaced apart from each of said plurality of network devices, said network hub means including a second connector coupled to each of said plurality of cables, said network hub means having a removable and replaceable termination element means for providing signal connectivity between selected ones of said plurality of cables such that each of said plurality of cables is coupled to another of said plurality of cables and any signal transmitted on said plurality of cables by said plurality of network devices both enters and exits said network hub at said second connector.

\* \* \* \* \*